United States Patent [19]

Fleischmann et al.

[11] 4,108,020

[45] Aug. 22, 1978

[54] STEERING WHEEL COVER

[76] Inventors: Reinhold Fleischmann, Fichtenstr. 7 8492 Furth i. Wald; Erich Schach, Ilsenburger Str. 10, 3388 Bad Harzburg, both of Germany

[21] Appl. No.: 664,523

[22] Filed: Mar. 8, 1976

[30] Foreign Application Priority Data

Jul. 19, 1975 [DE] Fed. Rep. of Germany ... 7523050[U]

[51] Int. Cl.$^2$ ............................................. B62D 1/06
[52] U.S. Cl. ...................................................... 74/558
[58] Field of Search .......................................... 74/558

[56] References Cited

U.S. PATENT DOCUMENTS

| 3,312,124 | 4/1967 | Meier et al. | 74/558 |
| 3,489,031 | 1/1970 | Meier | 74/558 |
| 3,530,739 | 9/1970 | Meier | 74/558 |

Primary Examiner—Benjamin W. Wyche
Assistant Examiner—Wesley S. Ratliff, Jr.
Attorney, Agent, or Firm—Lowhurst & Aine

[57] ABSTRACT

The steering wheel covers for automobiles includes a band of foam material having a pair of road opposed surfaces, the inner surface of which is to face the steering wheel crown and the outer surface of which is to be gripped by the hand, in use. The band is perforated with a multiplicity of through-going holes passing through the band from one broad surface to the opposed broad surface. The inner broad surface of the cover comprises a carrier foil having an adhesive surface to face the steering wheel crown with the carrier foil being tear resistant, elastic and having been formed during the foaming process utilized to form the foam band. The outer surface of the cover preferably includes a surface finish and includes a closed outer skin which is produced during the foaming process utilized to produce the foam band. The peripheral walls of the through-going holes are sealed so that the foam core is completely enclosed.

6 Claims, 3 Drawing Figures

STEERING WHEEL COVER

BACKGROUND OF THE INVENTION

This invention refers to steering wheel covers for automobiles formed from a band of foam material, with which the two end faces of the band are connected, especially welded to each other, the band is fixed by means of a tie cord, push-buttons or the like on the steering wheel crown, and the band is provided with throughgoing holes.

DESCRIPTION OF THE PRIOR ART

Steering wheel covers of this type are known, with which the band is provided with a closed skin on the outer surfaces, which skin is formed during the foaming process, and with which holes are punched through the closed outer skins and the porous foam core provided between the two closed outer skins so that an air connection from the lower surface of the band to the upper surface of the band exclusively is obtained through said throughgoing holes. Furthermore, said known steering wheel covers are fixed on the steering wheel crown by means of a tie cord, which is to be wound generally helically around said band in order to prevent the steering wheel cover from moving relative to the crown such as disclosed in U.S. Pat. No. 3,312,124 which issued to Meier et al on Apr. 4, 1967.

Steering wheel covers of said type have a number of disadvantages. If the material after a certain time of use loses its tension the cover slips rather easily on the steering wheel, especially, if the tie cord is not wound tightly, has got loosened or has got extended. Furthermore, the closed outer skin of said cover is not very pleasant to grip, the material feels cool at low temperatures and hot at high temperatures, so that with high outside temperatures and hot sunshine in a closed car the steering wheel cover will get too hot for being gripped. In view of this heating effect, the tie cord and the material of the cover itself lose part of their elasticity or alternatively lengthen so that slippage of the steering wheel cover on the steering wheel crown cannot be avoided.

In order to avoid said slipping effect of steering wheel covers on the steering wheel crown, it has been proposed with steering wheel covers made from leather to provide the covers on the surface facing the steering wheel crown with an adhesive layer, which is provided with a cover foil and which when applying the cover onto the steering wheel, the foil will be removed. However, adhering steering covers in said manner has not turned out to be acceptable, because when removing the cover from the steering wheel crown the cover will be damaged and some material will adhere to the steering wheel crown. In addition, said punched holes tend to allow perspiration, moisture and dirt to enter the foam material causing a foul odor and in addition the edges of said punched holes tend to be torn rather easily.

SUMMARY OF THE PRESENT INVENTION

It is an object of this invention to provide a steering wheel cover of the above-indicated type, which is formed in such a manner that it can be fixed on the steering wheel crown without slipping. A further object is to provide such a cover which can be applied in a simple and easy manner on the steering wheel crown and can be removed again. Another object of this invention is to provide a steering wheel cover with which the gripping and the pleasant grip feel are improved over known covers. Still another object of this invention is to provide a steering wheel cover which avoids the disadvantages of punched holes and which prevents perspiration, moisture and dirt from entering the foam material and, furthermore, prevents the edges of the holes from being torn down.

According to this invention, it is proposed that the cover comprises a tear-resistant, elastic foam carrier, which has good adhesive properties and is formed during the foaming process, and a foam core of plastic material which is formed on the foam carrier. Furthermore, throughgoing holes are provided in which peripheral walls thereof are welded closed so that the core is completely enclosed.

As a supporting layer for the adhesive carrier, i.e., very smooth silicon paper is used, on which an extremely thin foil is formed, which is processed in a soft condition, and which simultaneously is the carrier and the adhesive foil. The adhesive carrier is tear-resistant and elastic. It gets its adhesive property during the forming of the carrier based on the special conditions of the production process. The adhesive carrier, which simultaneously is the adhesive layer, takes up the foam core of the band, which is formed from foam material in the required thickness. The foam core on its one side which faces the steering wheel crown has the adhesive carrier foil. On its opposite side is the foam material for the open cell foam core. The last mentioned surface can be treated, i.e., embossed, and can take a finish in order to get certain surface properties, i.e., increased wear resistance. It is preferred to provide the finish with pores of very small size so that the open cell foam material will not be changed in its structure, especially the open cells will not be closed by the finish. The open porosity of the foam material at the gripping surface is very important for the properties of pleasant grip and for feeling cool at hot temperatures and for feeling warm at low temperatures.

The aforementioned adhesive foil also can be applied to other steering wheel covers, especially steering wheel covers of the known type, in order to give said steering wheel covers adhesive properties, which prevent slipping of the cover applied to the steering wheel crown.

The material used for the cover according to this invention is a special material produced and distributed by Messrs. Carl Freudenberg, Weinheim/Bergstrabe, Germany, for steering wheel covers of this special type.

In the following a preferred emobdiment of this invention is explained in combination with the drawings.

DESCRIPTION OF THE PREFERRED EMBODIMENTS

Figure 1:
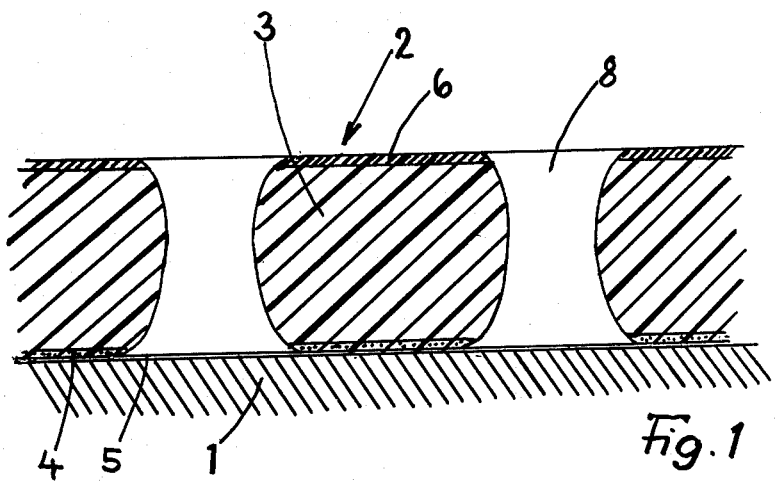
FIG. 1 shows a cross-section through the cover material according to this invention.
Figure 2:
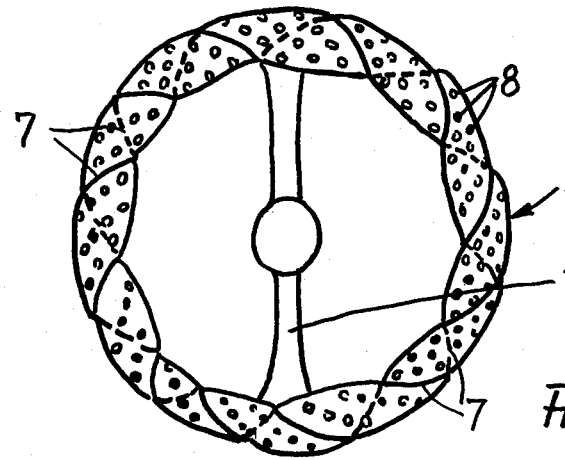
FIG. 2 shows schematically a steering wheel crown with an applied steering wheel cover according to the invention.

FIGS. 1 and 2 show schematically a steering wheel crown 1 onto which the steering wheel cover 2 has been applied. Said steering wheel cover 2 is made of a foam core 3, which consists of open cell foam material, and an adhesive carrier 4, being the foam carrier, which on its surface 5 has got adhesive properties formed during the production of the carrier foil (supporting foil). At the gripping surface, a finish 6 has been provided on the steering wheel cover.

Figure 3:
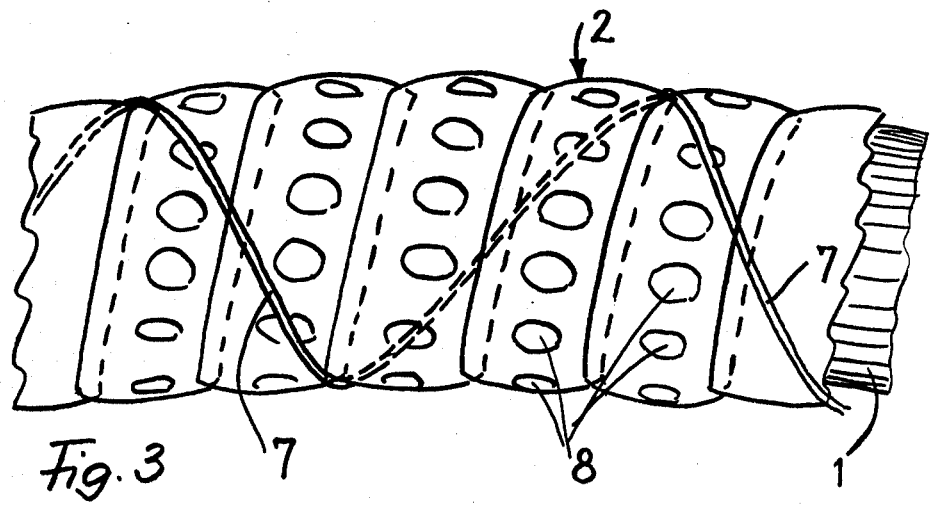
FIG. 3 shows another embodiment of the steering wheel cover according to this invention.

In FIG. 3, another embodiment of the inventive band is shown, according to which the band 2 has been applied to the steering wheel crown in a helical manner. Also, in this embodiment, the adhesive carrier foil has been applied to the steering wheel crown in a non-slippage manner in which the tie cord 7, which is an additional fixing means for the band, is applied in a direction opposite to the winding direction of the band 2. The welded holes are indicated by 8.

What is claimed is:

1. A steering wheel cover for enveloping the crown of an automobile steering wheel comprising:
    a band of foam material having a pair of broad opposed surface skins, one of said skins defining an outer surface which is to be gripped by the hand in use and the other of said skins defining an inner surface for direct contact with the crown of the steering wheel; and
    a plurality of perforations passing through said band from one surface skin to the other, the entire peripheral walls of said perforations being nonporous.
2. A steering wheel cover in accordance with claim 1 in which said skin defining said inner surface is selected sufficiently thin and soft to exhibit adhesive qualities.
3. A steering wheel cover in accordance with claim 1 in which said skin defining said outer surface is porous.
4. A steering wheel cover for enveloping the crown of an automobile steering wheel comprising:
    a band of foam material having a pair of broad opposed surface skins, one of said skins being porous and defining an outer surface which is to be gripped by the hand in use and the other of said skins defining an inner surface for direct contact with the crown of the steering wheel; and
    a plurality of perforations passing through said band from one surface skin to the other.
5. A steering wheel cover in accordance with claim 4 in which the entire peripheral surfaces of said perforations is nonporous.
6. A steering wheel cover in accordance with claim 5 in which said skin defining said inner surface is selected sufficiently thin and soft to exhibit adhesive qualities.

* * * * *